United States Patent [19]
Ishikawa et al.

[11] Patent Number: 5,589,205
[45] Date of Patent: Dec. 31, 1996

[54] APPARATUS FOR MANUFACTURING HOLLOW RESIN PRODUCTS

[75] Inventors: Hajime Ishikawa, Toyonaka; Masaaki Ogawa, Kobe; Ryosuke Hasegawa, Kobe; Hideo Yamamoto, Kobe, all of Japan

[73] Assignee: Tigers Polymer Corporation, Toyonaka, Japan

[21] Appl. No.: 329,648

[22] Filed: Oct. 25, 1994

[30] Foreign Application Priority Data

Oct. 26, 1993 [JP] Japan ................. 5-266811
Sep. 29, 1994 [JP] Japan ................. 6-234958

[51] Int. Cl.$^6$ .................................. B29C 49/64
[52] U.S. Cl. ................ 425/526; 264/542; 425/532; 425/534
[58] Field of Search ................ 425/532, 534, 425/526; 264/541, 542

[56] References Cited

U.S. PATENT DOCUMENTS

| | | | |
|---|---|---|---|
| 3,775,524 | 11/1973 | Seefluth | 264/521 |
| 3,809,521 | 5/1974 | LaFosse | 425/526 |
| 3,844,700 | 10/1974 | Sokolow | 425/532 X |
| 3,892,830 | 7/1975 | Hudson et al. | 264/520 |
| 4,239,474 | 12/1980 | Nakagawa | 425/525 |
| 4,319,872 | 3/1982 | Lupke et al. | 425/532 X |
| 4,362,688 | 12/1982 | Nakagawa | 264/503 |
| 4,738,612 | 4/1988 | Kikuchi et al. | 425/532 |
| 4,777,006 | 10/1988 | Wenger et al. | 264/531 X |
| 4,865,799 | 9/1989 | Sadr | 425/532 X |
| 5,000,905 | 3/1991 | Cox et al. | 425/534 X |
| 5,030,083 | 7/1991 | Kohno et al. | 425/532 |
| 5,264,178 | 11/1993 | Yamamura et al. | 264/531 |
| 5,288,224 | 2/1994 | Yamamura et al. | 425/531 |
| 5,464,635 | 11/1995 | Geiger | 264/531 X |

FOREIGN PATENT DOCUMENTS

| | | | |
|---|---|---|---|
| 52-25859 | 2/1977 | Japan | 264/521 |
| 53-10659 | 1/1978 | Japan | 264/540 |
| 61-41522 | 2/1986 | Japan . | |
| 3-261534 | 11/1991 | Japan | 264/540 |

*Primary Examiner*—Richard L. Chiesa
*Attorney, Agent, or Firm*—Burns, Doane, Swecker & Mathis, LLP

[57] ABSTRACT

An apparatus for manufacturing hollow resin products. The apparatus includes an extruder for extruding a tubular resin material and cutting the material into a parison with a specified length; a blow molding machine having an upper mold and a lower mold which form a cavity of a specified shape inside; and a parison delivering machine for receiving the parison from the extruder and feeding the parison into the cavity of the lower mold. The parison delivering machine includes a conveyer which has parison feeder for feeding a parison longitudinally from an inlet to an outlet, a driver for driving the feeder, and at least four shafts which serve as pivots of three-dimensional movement of the conveyor.

9 Claims, 11 Drawing Sheets

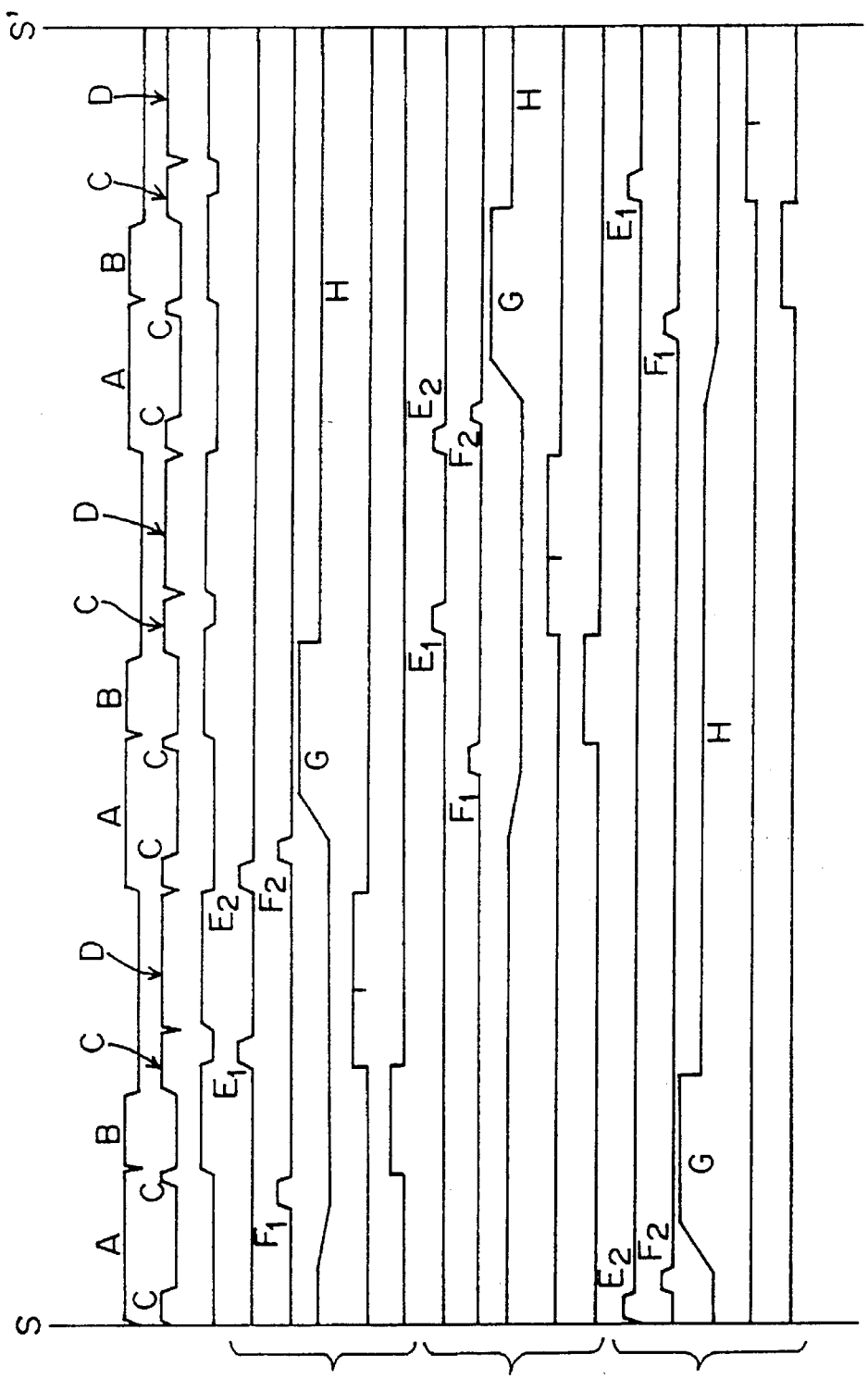

APPARATUS FOR MANUFACTURING HOLLOW RESIN PRODUCTS

BACKGROUND OF THE INVENTION

1. Field of the Invention

The present invention relates to an apparatus and a method for manufacturing hollow resin products, such as hoses and pipes, by blow molding.

2. Description of Related Art

Hoses to be provided in the engine room of an automobile, such as a defroster hose, an air hose, a radiator hose, etc. are curved two-dimensionally or three-dimensionally as shown in FIG. 4 to facilitate the fitting therein. Such a complicatedly curved resin article is conventionally produced by blow molding which has steps of: making a parison by cutting a resin material extruded from a die head of an extruder; feeding the parison into a cavity of a mold; and injecting compressed air into the parison. The most difficult step in the blow molding is the step of feeding the parison into the cavity of the mold (ordinarily a lower mold). With respect to this step, Japanese Laid Open Publication No. 53-56262 suggested moving the mold, and Japanese Laid Open Publication No. 55-21239 suggested moving the die head of the extruder. However, the necessity of moving the mold or the die head causes the apparatus to become large.

Further, Japanese Patent Publication No. 4-4931 disclosed a method using a conveyer provided between an extruder and a mold. The method has steps of: placing a parison extruded from the extruder on the conveyer; and moving the conveyer two-dimensionally or three-dimensionally so as to feed the parison into the cavity correctly. The conveyer is moved horizontally (in the X direction and in the Y direction) and if necessary vertically (in the Z direction). However, in this method, the moving speed of the conveyer is slow, and accordingly it takes a long time to deliver the parison to the mold. Moreover, while the parison is being fed into the cavity, the parison may be twisted by curved portions of the cavity (portions 42b and 42c of the cavity 42 shown in FIG. 3 which corresponds to the curved portions 2 and 3 of the hose 1 shown in FIG. 4).

In the blow molding, the temperature of the parison is important. The portions of the parison which are in contact with the conveyer and the mold are cooled more easily than the other portions, and at the time of injection of compressed air, the portions at a lower temperature do not expand so much as the other portions. Consequently, the wall thickness there becomes larger, and the molded product has a varied wall thickness.

SUMMARY OF THE INVENTION

An object of the present invention is to provide an apparatus for manufacturing hollow resin products which feeds a parison into a cavity of a mold speedily and smoothly without twisting the parison at curved portions.

Another object of the present invention is to provide an apparatus for manufacturing hollow resin products which has a good productivity.

A further object of the present invention is to provide a conveyer which receives a parison from an extruder smoothly and feeds the parison into a cavity of a lower mold smoothly.

Another object of the present invention is to provide a conveyer for delivering a parison from an extruder to a lower mold, the conveyer having a prevention against variation of the wall thickness of a product.

Another object of the present invention is to provide a method of manufacturing hollow resin products which can prevent variation of the wall thickness of a product.

In order to attain the objects above, a manufacturing apparatus according to the present invention comprises an extruder for extruding a tubular resin material and cutting the material into a parison with a specified length; a blow molding machine which has a cavity between an upper mold and a lower mold; and a parison delivering machine for receiving a parison from the extruder and feeding the parison into the cavity of the blow molding machine. The parison delivering machine has: a conveyer which has parison feeding means for feeding the parison longitudinally from an inlet to an outlet; and at least four shafts which serve as pivots of three-dimensional movement of the conveyer.

In the apparatus of the present invention, the parison extruded from the extruder is placed on the parison feeding means (for example, a caterpillar, a belt or a group of rollers) of the conveyer through the inlet, and with a drive of the feeding means, the parison is fed to the outlet and then into the cavity of the molding machine. The conveyer rotates and swings by using the four shafts as pivots, and the outlet of the conveyer can move along the cavity even if the cavity is three-dimensionally curved. Thus, because of the three-dimensional movement of the conveyer, the parison can be fed into the cavity speedily with no twists.

The four shafts mean a shaft for a movement of the conveyer in parallel to the floor, a shaft for a forward/backward movement of the conveyer a shaft for an upward/downward movement of the conveyer, and a shaft for a horizontal rotation of the conveyer on its central portion in the longitudinal dimension.

In the manufacturing apparatus, it is preferred that three blow molding machines are provided to work with one extruder and one parison delivering machine. While a parison delivered to a first blow molding machine is being subjected to blow molding and cooling, the parison delivering machine delivers a parison to a second molding machine and then delivers a parison to a third molding machine. By operating the three blow molding machines continuously in this way, the manufacturing apparatus can manufacture hollow resin products efficiently.

A conveyer according to the present invention has parison feeding means comprising a plurality of segments connected endlessly, the segments being substantially semicircular so as to agree with the shape of a parison; and driving means for driving the parison feeding means. The semicircular segments form a semicylindrical feeding means, and because of the semicylindrical shape, the feeding means can feed a parison, which is hot and soft, smoothly without distorting the parison.

By providing heating means for heating the segments, the parison is prevented from cooling down. Further, if the feeding means and the heating means are enclosed with a heat insulator, it will stabilize the internal temperature of the conveyer and secure the operator from the heat. If guide rollers are provided at the inlet and the outlet of the conveyer, the parison feeding will be smoother.

In a manufacturing method according to the present invention, a parison is fed from a conveyer into a lower mold of a blow molding machine such that a side of the parison which has been in contact with the conveyer is put into contact with the lower mold, and the conveyer is at a higher temperature than the parison. If the temperature of the conveyer is lower than that of the parison, the side of the parison in contact with the conveyer will be cooled, and the side will be further cooled by contact with the lower mold. Then, when the parison is blow-molded, the cooled portion will have a thicker wall. In the method of the present invention, however, since the temperature of the conveyer is higher than that of the parison, the side of the parison in contact with the conveyer is heated, and when the side comes into contact with the lower mold, the side becomes the same temperature as the other side. Then, the parison can be blow-molded into a product with an even wall thickness. Also, it occasionally happens that the parison gets an impression of the conveyer on the side in contact with the conveyer, but the heating of the side helps erase the impression.

In another manufacturing method according to the present invention, a parison is fed from a conveyer into a lower mold of a blow molding machine such that a side of the parison which has been out of contact with the conveyer is put into contact with the lower mold. As mentioned, it occasionally happens that the parison gets an impression of the conveyer on the side in contact with the conveyer. Then, if the side with the impression is put into contact with the lower mold, the side will be cooled, and the impression will be fixed thereon. In this method, however, the side which has been out of contact with the conveyer is put into contact with the lower mold, and it never happens that the side with the impression is cooled by contact with the lower mold. Then, when the parison is blow-molded, the side with the impression is pushed against the upper mold, and the impression disappears. In this method, further, if the conveyer is at a lower temperature than the parison, when the parison is fed into the lower mold from the conveyer, the side which was in contact with the conveyer and the side which was out of contact with the conveyer will be the same temperature, resulting in an even wall thickness.

BRIEF DESCRIPTION OF THE DRAWINGS

These and other objects and features of the present invention will be apparent from the following description with reference to the accompanying drawings, in which:

FIG. 14 is a time chart showing one cycle of operation of the manufacturing system of FIG. 1.

DETAILED DESCRIPTION OF THE PREFERRED EMBODIMENTS

The preferred embodiments of the present invention are hereinafter described with reference to the accompanying drawings.

Figure 1:
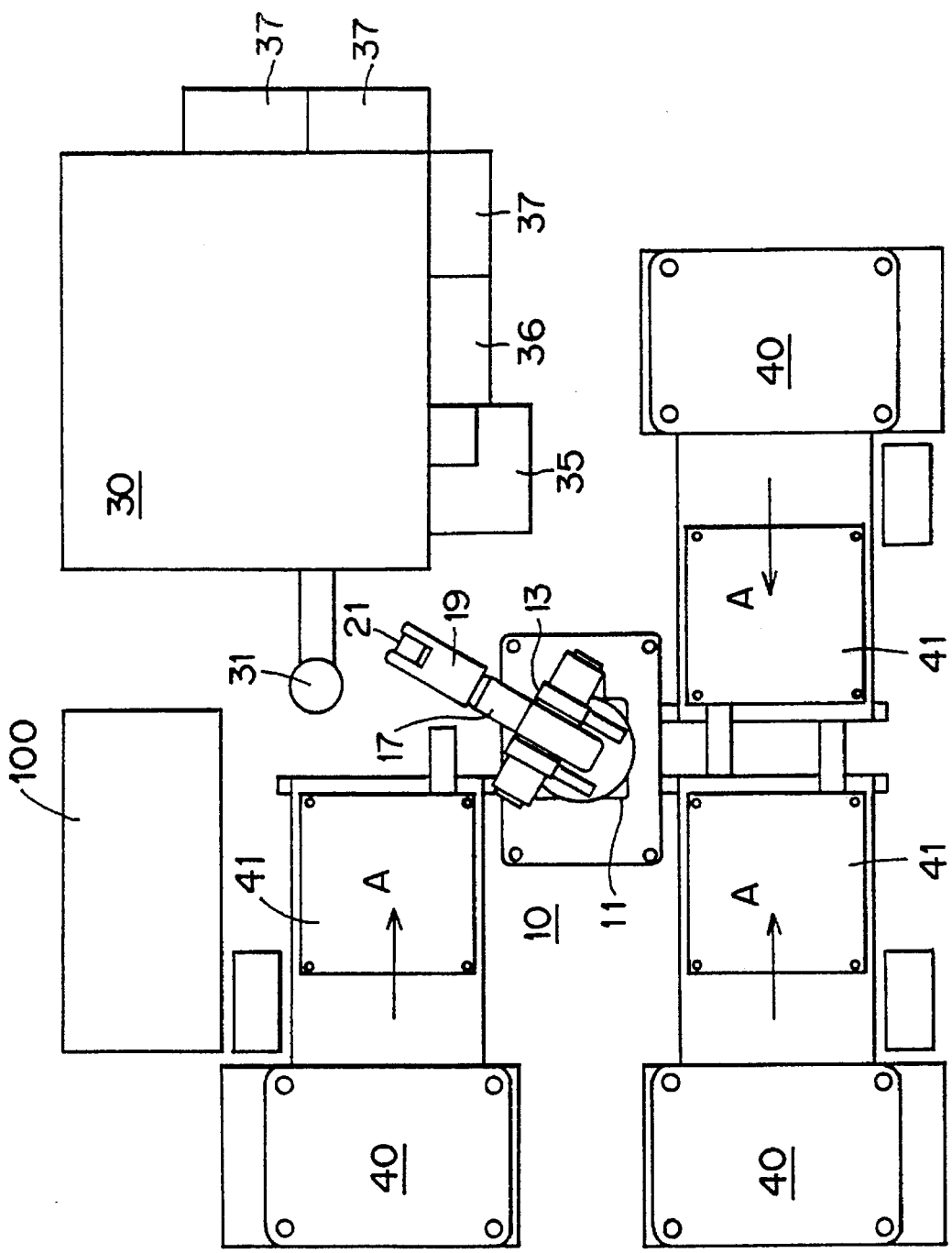
FIG. 1 is a plan view of a manufacturing system according to the present invention, showing the arrangement of components.

FIG. 1 is a plan view of a whole apparatus for manufacturing hollow resin products. A parison deliver robot 10 is disposed in the center, and an extruder 30 and three blow molding machines 40 are disposed in the periphery. The extruder 30 is of a conventional type which extrudes a tubular resin material downward from a die head 31 and cuts the resin material into a parison with a specified length. Around the extruder 30, a robot control board 35, a centralized control board 36, and closing control boards 37 are disposed.

Figure 3:
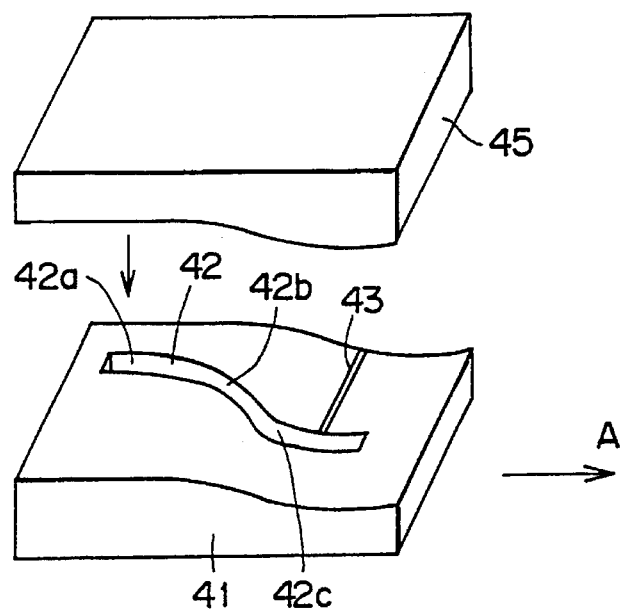
FIG. 3 is a perspective view of a mold for blow molding.
Figure 4:
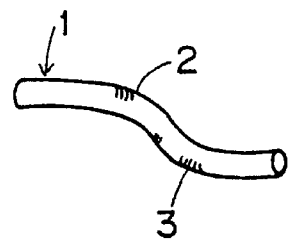
FIG. 4 is a hose molded by the mold of FIG. 3.

As shown in FIG. 3, each of the blow molding machines 40 has a lower mold 41 and an upper mold 45, and is open and closed by moving up and down the upper mold 45. The lower mold 41 is slidable in a direction indicated by the arrow A and in the opposite direction. The lower mold 41 is moved in the direction indicated by the arrow A to be set in a parison receiving position. FIG. 1 shows a state wherein the lower molds 41 of the blow molding machines 40 are set in the respective parison receiving positions. The molds 41 and 45 have a cavity 42 which is identical with the product, a hose 1 (see FIG. 4), although the portion in the upper mold 45 is not seen in FIG. 3. Further, the lower mold 41 has a nozzle hole 43 which extends from an edge to the cavity 42.

Additionally, a blow air unit 100 is provided to inject compressed air to parisons placed in the molds 41 and 45 of the blow molding machines 40.

Figure 2:
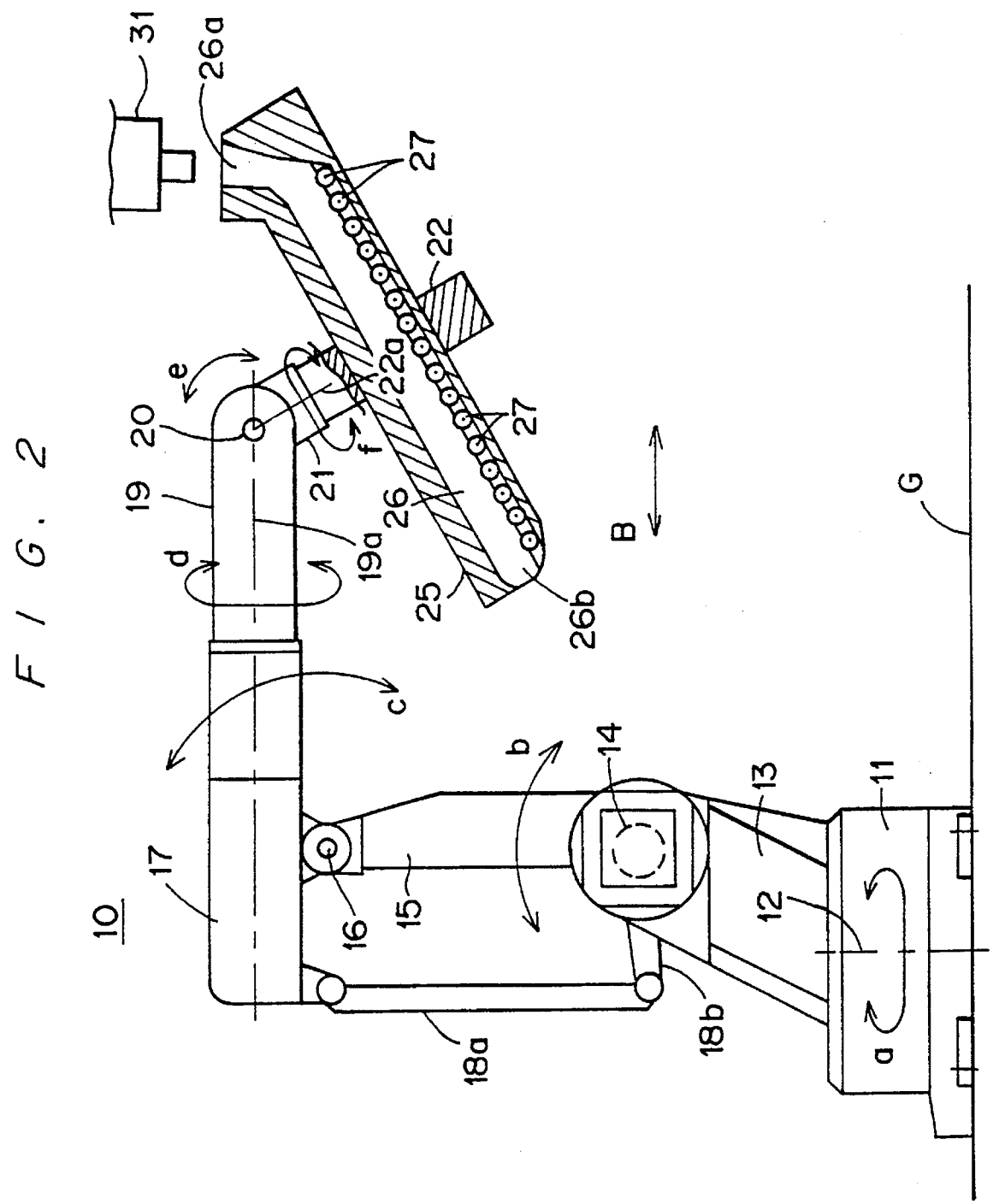
FIG. 2 is a front view of a robot which is a component of the manufacturing system of FIG. 1.

Next, referring to FIG. 2, the robot 10 is described.

The robot 10 is to receive parisons extruded from the die head 31 of the extruder 30 on a conveyer 25 and to deliver the parisons to the cavities 42 of the lower molds 41 set in the parison receiving positions one by one. A base column 11 is fixed on a floor G, and a first support column 13 is fitted to the base column 11 via a shaft 12 to be pivotable on the shaft 12 in a direction indicated by the arrow a. A second support column 15 is provided over the first support column 13 and is connected thereto by a shaft 14. The second support column 15 is pivotable on the shaft 14 in a direction indicated by the arrow b. A beam 17 is provided over the second support column 15 and is connected thereto by a shaft 16. The beam 17 is pivotable on the shaft 16 in a direction indicated by the arrow c. The rear side of the beam 17 is supported by the first support column 13 via links 18a and 18b. On the front side of the beam 17, a first arm 19 is provided to be rotatable in a direction indicated by the arrow d. A second arm 21 is fitted to the first arm 19 at the front end via a shaft 20 to be pivotable on the shaft 20 in a direction indicated by the arrow e. Further, a holder 22 is fitted to the arm 21 to be rotatable in a direction indicated by the arrow f.

The conveyer 25 is held by the holder 22 in the central portion in the longitudinal dimension. The conveyer 25 has a hollow 26 extending in the longitudinal direction. One end of the hollow 26 serves as a parison inlet 26b, and the other end thereof serves as a parison outlet 26b. On a wall of the hollow 26, a number of rollers 27 are provided to be rotatable counterclockwise in FIG. 2.

The robot 10 has driving means to rotate the first support column 13, the second support column 15, the beam 17, the first arm 19, the second arm 21 and the holder 22 in the directions a, b, c, d, e and f respectively, and further has driving means to rotate the rollers 27, although the driving means are not illustrated.

The shaft 12 extends vertically to the floor G, and by the pivoting of the first support column 13 on the shaft 12, the conveyer 25 moves in parallel to the floor G. Thereby, the conveyer 25 can move between a position under the die head 31 of the extruder 30 and positions above the lower molds 41 which are set in the parison receiving positions.

The second support column 15 pivots on the shaft 14 in the direction indicated by the arrow b, and thereby, the conveyer 25 can move backward and forward as indicated by the arrow B. The beam 17 pivots on the shaft 16 in the direction indicated by the arrow c, and thereby, the conveyer 25 can move up and down. The first arm 19 rotates on its axis 19a in the direction indicated by the arrow d, and thereby, the conveyer 25 swings right and left (in a direction perpendicular to the direction indicated by the arrow B), that is, rolls. The second arm 21 pivots on the shaft 20 in the direction indicated by the arrow e, and thereby, the conveyer 25 swings backward and forward, that is, pitches. The holder 22 rotates on its axis 22a in the direction indicated by the arrow f, and thereby, the conveyer 25 rotates.

Now, a process of delivering a parison to the lower mold 41 of one of the blow molding machines 40 is described.

First, the conveyer 25 is rotated such that the inlet 26a will come right under the die head 31 of the extruder 30. A parison is extruded downward from the die head 31 and is guided onto the rollers 27 through the inlet 26a. The rollers 27 are rotated to feed the parison to the outlet 26b. The circumferential speed of the rollers 27 is equal to the parison extruding speed.

Next, the conveyer 25 is moved to a position above the lower mold 41 which is drawn from the blow molding machine 40. Further, the conveyer 25 is rotated and/or moved backward and forward and/or up and down such that the outlet 26b will come right above an end 42a of the cavity 42. Then, the rollers 27 are driven to feed the parison out through the outlet 26b, and simultaneously the conveyer 25 is rotated and/or moved backward and forward and/or up and down such that the outlet 26b can move along the cavity 42. Thus, the parison is put in the cavity 42. The feed of the parison and the movement of the outlet 26b along the cavity 42 are at the same speed.

After feeding the parison into the cavity 42, the conveyer 25 is returned under the die head 31. Meanwhile, the lower mold 41 is returned inside the blow molding machine 40, and the lower mold 41 and the upper mold 45 are closed. The molds 41 and 45 are kept at a specified temperature. Then, a nozzle (not illustrated) is inserted through the nozzle hole 43, and compressed air is injected into the parison. Thus, blow molding is carried out.

As described above, in this embodiment, since the movement of the conveyer 25 is controlled by columns and arms pivotable on six shafts, the conveyer 25 can move along the three-dimensionally curved cavity 42 smoothly and speedily, which results in shortening of the time of the parison feeding process. The rotation of the holder 22 in the direction indicated by the arrow f and the rotation of the first arm 19 in the direction indicated by the arrow d are especially effective. Because of these rotations, the conveyer 25 can swing and rotate to feed the parison into the cavity 42 with three-dimensional curves 42b and 42c, without twisting the parison.

In the robot 10, the structure of combination of the shafts and the driving means may be of any type. Although six shafts are used in the embodiment, what are indispensable are only four shafts, namely, the first shaft 12, the second shaft 14, the third shaft 16 and the sixth shaft 22a.

In the embodiment, rollers 27 are provided inside the conveyer 25 as parison feeding means, but it is possible to use a belt instead of the rollers 27. It is preferred for stable feeding of the parison that the rollers or the belt is semicircular and concave in the central portion to agree with the shape of the parison.

Figure 5:
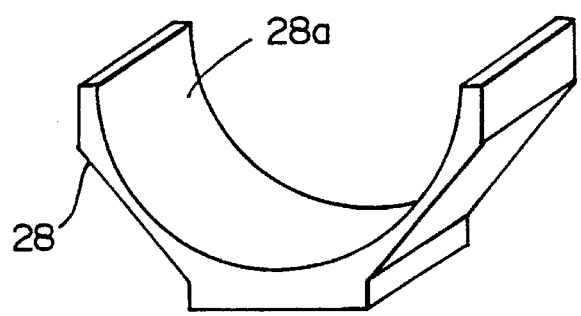
FIG. 5 is a perspective view of a caterpillar segment which is a component of parison feeding means.
Figure 6:
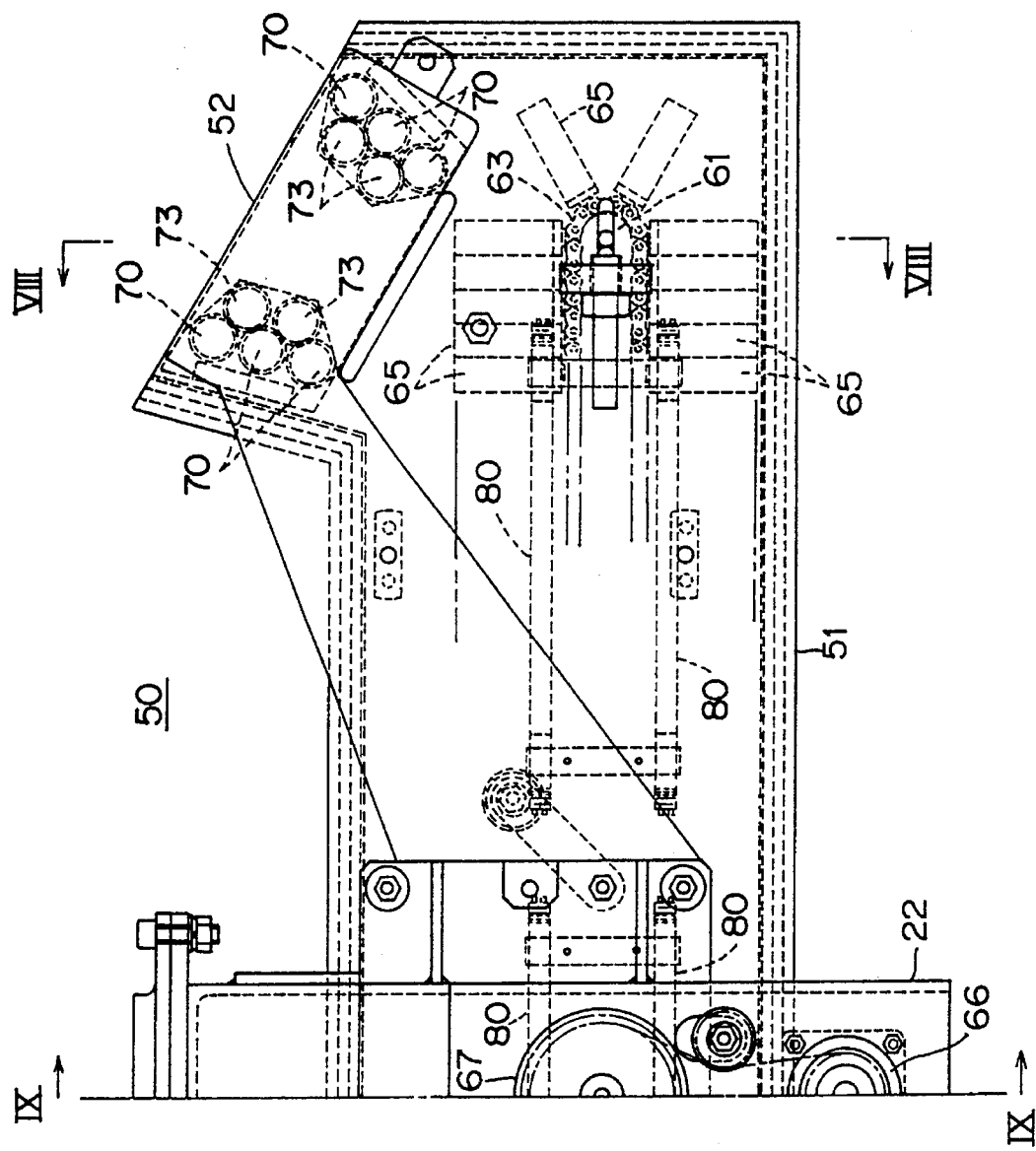
FIG. 6 is a front view of a conveyer according to the present invention, showing the right half thereof.
Figure 7:
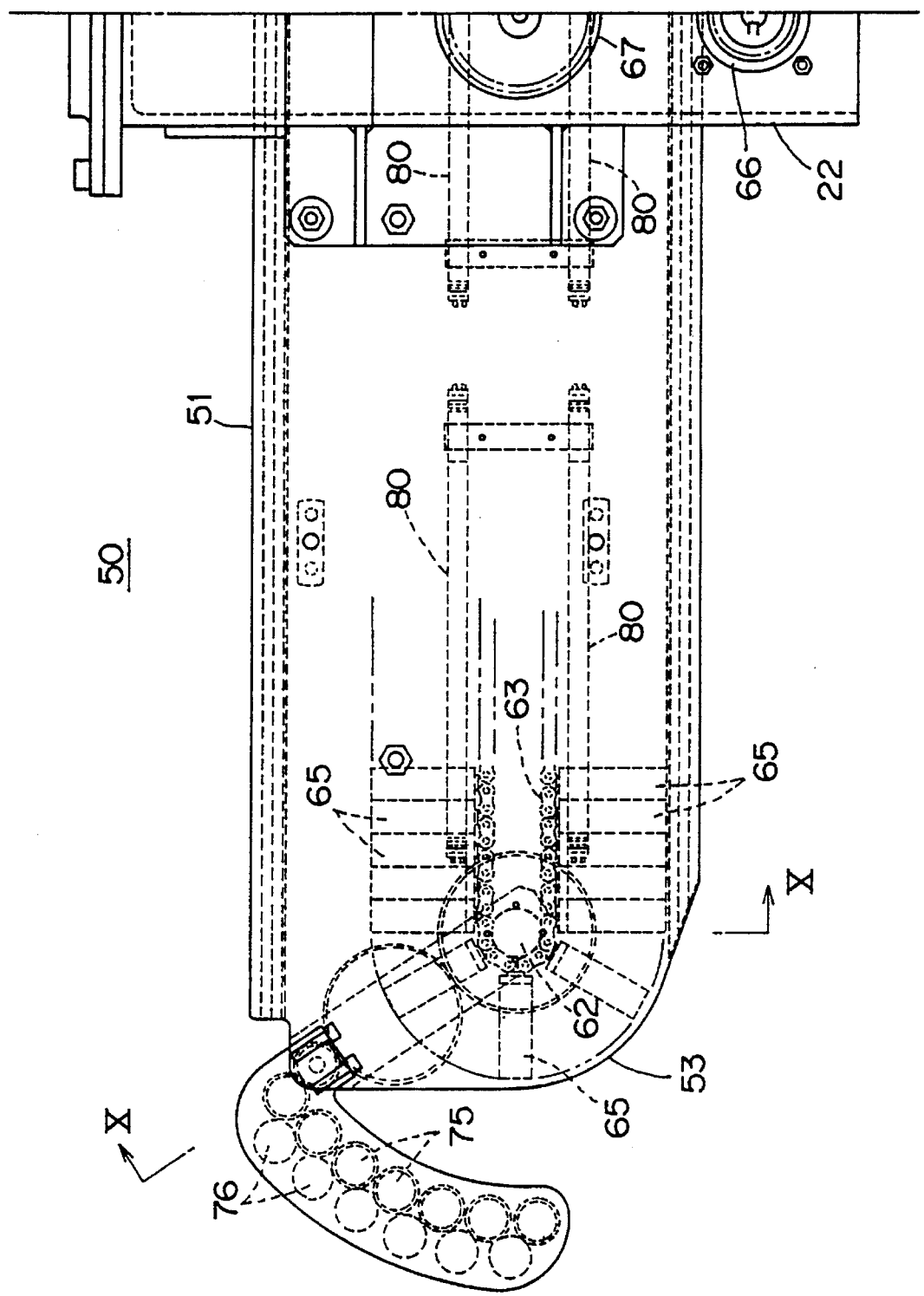
FIG. 7 is a front view of the conveyer, showing the left half thereof.

Further, the parison feeding means may be a caterpillar. In this case, a plurality of segments 28, one of which is illustrated in FIG. 5, are disposed with no intervals around an endless chain, and the parison is received on semicircular surfaces 28a of the segments 28.

Next, referring to FIGS. 6 through 10, another conveyer 50 which can be used instead of the conveyer 25 is described.

Figure 8:
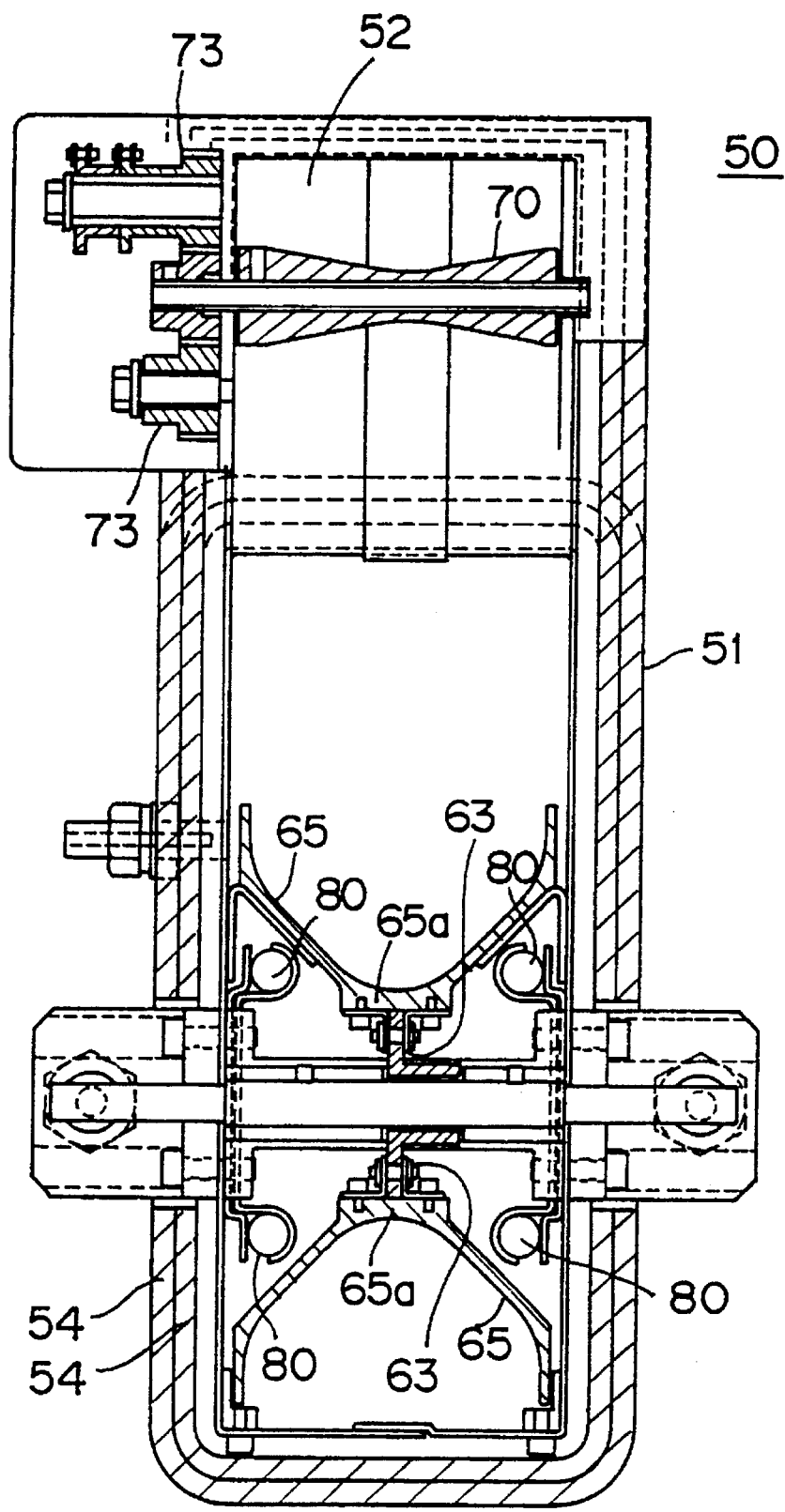
FIG. 8 is a sectional view of the conveyer, taken along the line VIII—VIII in FIG. 6.
Figure 9:
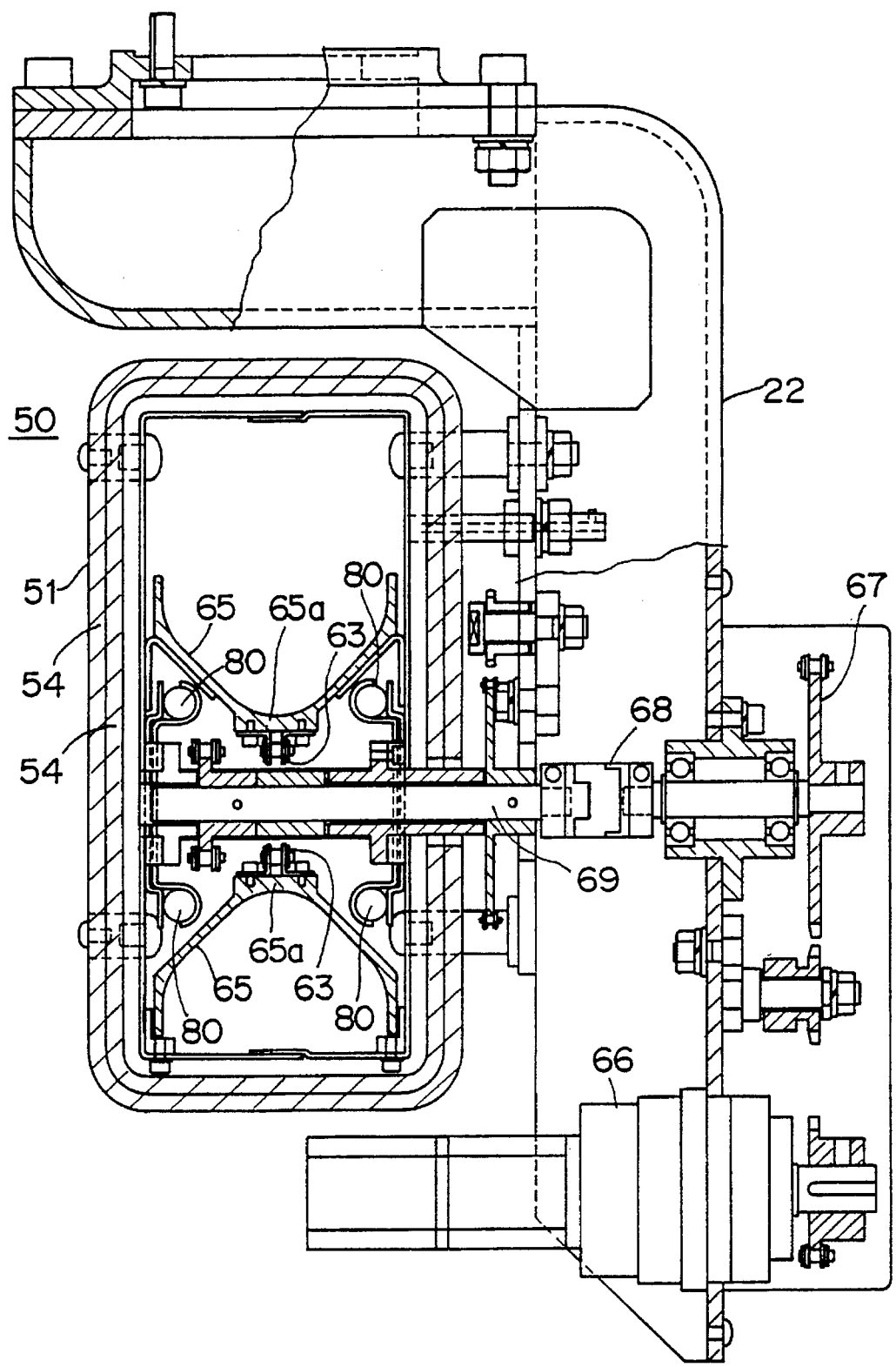
FIG. 9 is a sectional view of the conveyer, taken along the line IX—IX in FIG. 6.
Figure 10:
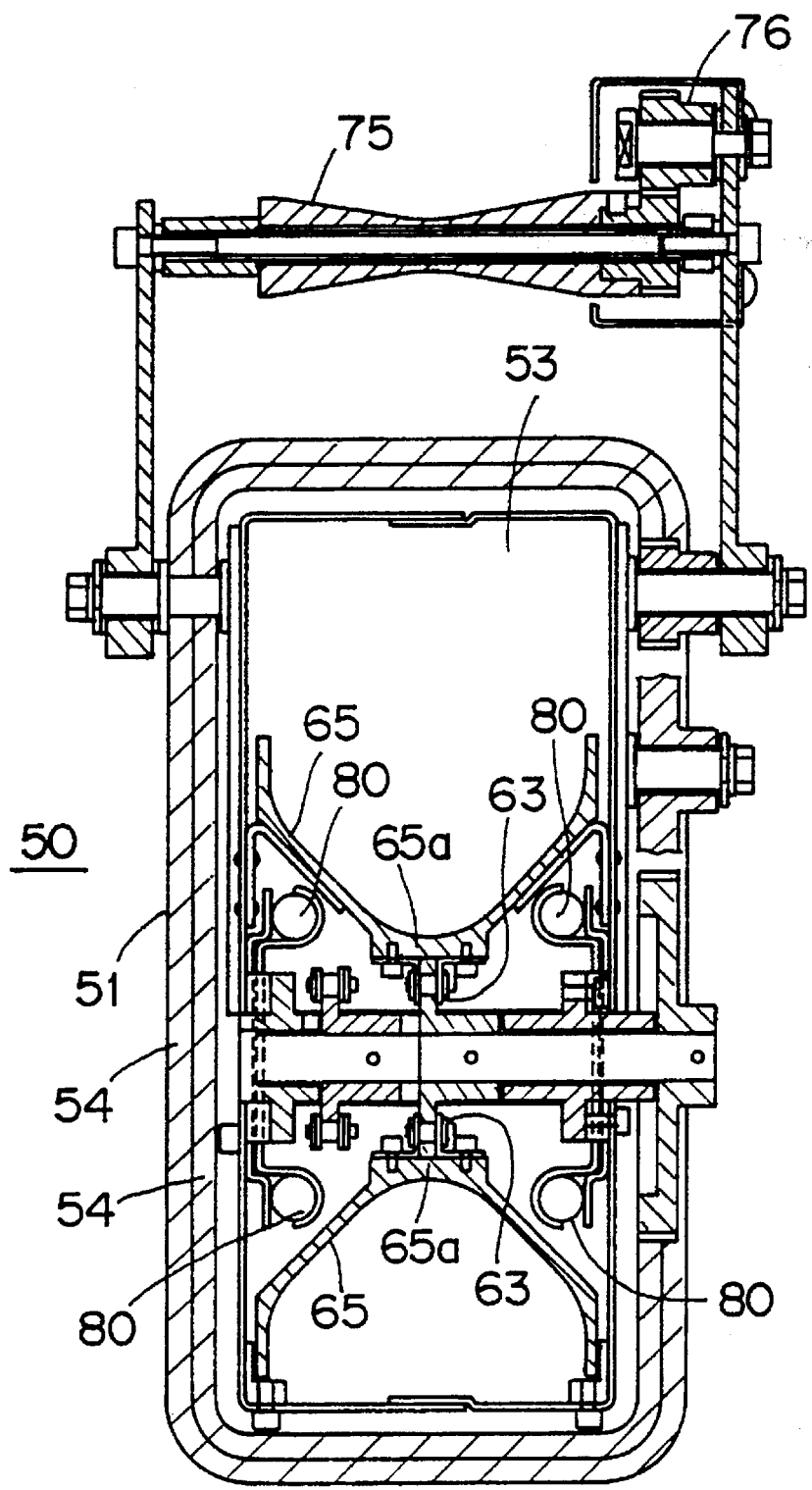
FIG. 10 is a sectional view of the conveyer, taken along the line X—X in FIG. 7.
Figure 11:
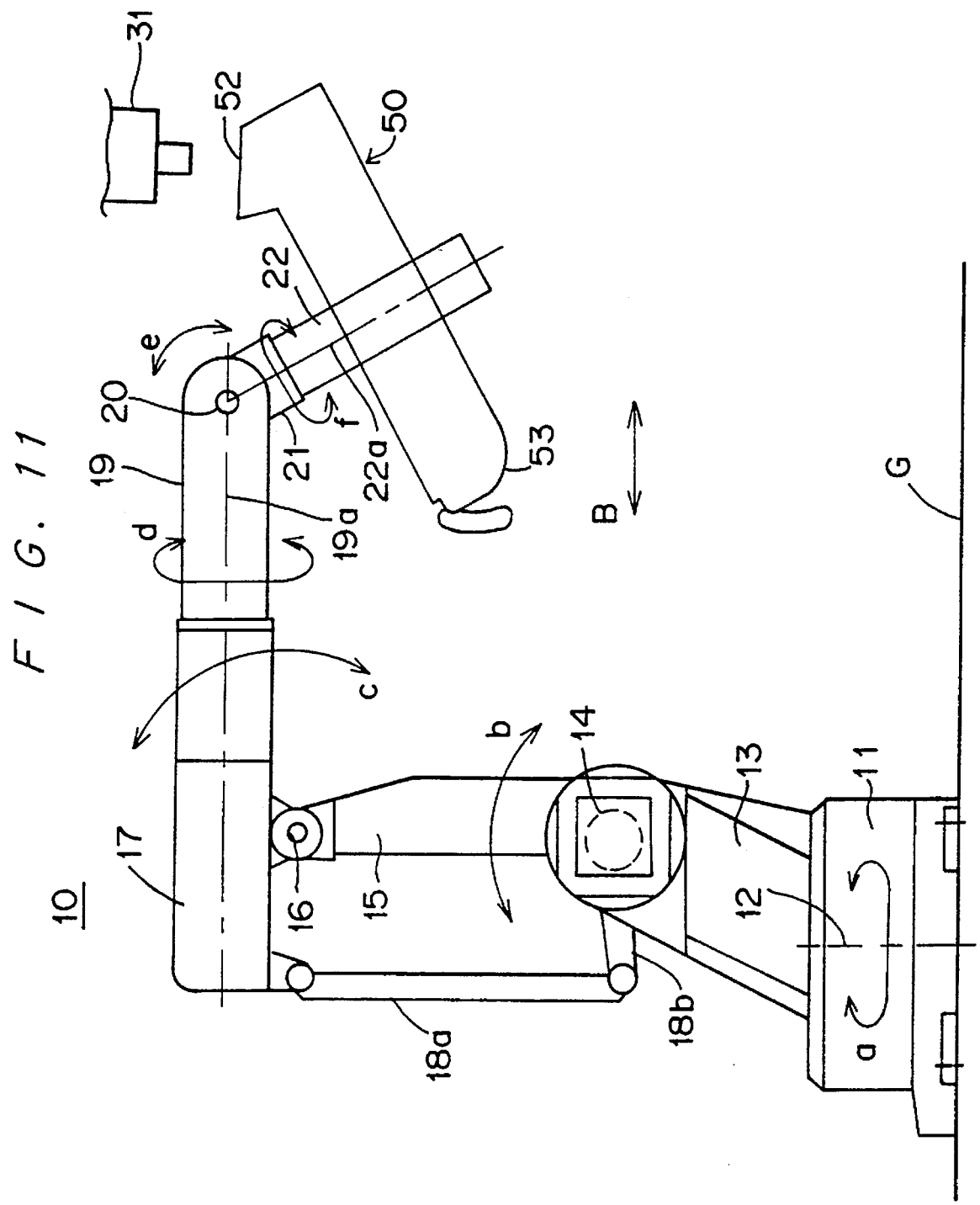
FIG. 11 is a front view of the robot of FIG. 2 which is provided with the conveyer of FIGS. 6 through 10.

The conveyer 50 has caterpillar type parison feeding means. A housing 51 of the conveyer 50 has a parison inlet 52 at an end and a parison outlet 53 at the other end and is held by the holder 22 of the robot 10 in the central portion. The housing 51 has a rectangular section as seen in FIGS. 8 through 10 and has a two-layer heat insulator 54. FIG. 11 shows a state wherein the conveyer 50 is fitted to the robot 10. The robot 10 of FIG. 11 has the same structure as that of FIG. 2, and the portions are provided with the same reference symbols as in FIG. 2.

In the housing 51, a chain 63 is laid between sprockets 61 and 62 which are disposed at the front portion and the rear portion respectively. A plurality of segments 65 are disposed around the chain 63, and bases 65a of the segments 65 are fixed on the chain 63. Each of the segments 65 has a similar shape to the segment 28 illustrated in FIG. 5. The base 65a has an arc inner surface, and side walls are extended upward from the arc inner surface, slanting outwardly at an angle of approximately 45 degrees and ending in upright. The segments 65 fitted to the chain 63 have no intervals thereamong, and they form a substantially semicylindrical feed path in a linear portion of the chain 63. A motor 66 (see FIG. 9) is provided in the holder 22 of the robot 10. The chain 63 is driven by the motor 66 via the sprocket 67, a coupling 68 and a shaft 69, and rotates counterclockwise in FIG. 7. The rotating speed is preferably changeable to correspond to the parison extruding speed of the extruder 30 and the parison feeding speed.

At the inlet 52 of the housing 51, as shown in FIG. 8, guide rollers 70, each of which thins in the central portion, are provided. These guide rollers 70 are to guide a parison extruded from the die head 31 of the extruder 30 to the segments 65. The guide rollers 70 are driven by the motor 66 via the sprocket 67, a chain and idle gears 73.

At the outlet 53 of the housing 51, as shown in FIG. 10, guide rollers 75, each of which thins in the central portion, are provided. These guide rollers 75 are to guide a parison fed by the segments 65 to a lower mold 41. The guide rollers 75 are driven by the motor 66 via the sprocket 62, a chain and idle gears 76.

Further, heaters 80 are provided inside the housing 51. Four heaters are around the inlet 52, four heaters are in the central portion, and four heaters are around the outlet 53. These heaters 80 heat up the segments 65 to prevent a parison fed thereby from cooling down or to positively heat up the parison. The heaters 80 are controllable individually. The conveyer 50 is open at the inlet 52 and at the outlet 53, and the segments 65 around the inlet 52 and the outlet 53 easily cool down. Therefore, the heaters 80 thereadround are set to a higher temperature. The conveyer 50, like the conveyer 25, is suspended by the robot 10 and delivers parisons to the lower molds 41 in a slanting posture with the outlet 53 lower. In this state, the portion around the outlet 53 cools down the most quickly because heat diffuses upward. Therefore, it is preferred that the heaters 80 around the outlet 53 are set to a relatively high temperature.

The temperature setting of the heaters 80 is closely related to the way of putting a parison into a lower mold 41.

Figure 12:
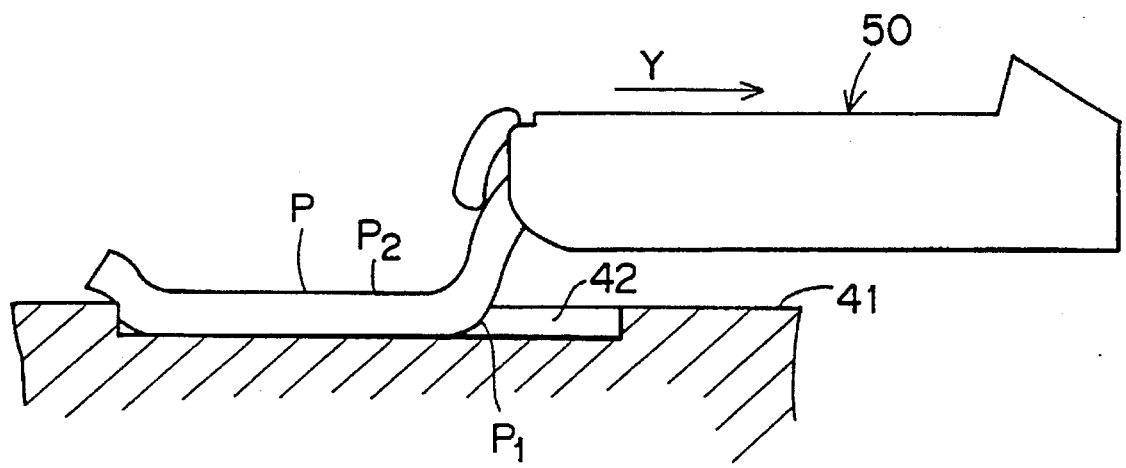
FIG. 12 is an illustration of a first way of putting a parison into a cavity.

A first way is, as shown in FIG. 12, to put the side $P_1$ of a parison P which has been in contact with the segments 65 into contact with the cavity 42 of a lower mold 41. In this case, the conveyer 50 moves in a direction indicated by the arrow Y. The parison P is cooled and simultaneously hardened a little by contact with the cavity 42. At the next step of injecting compressed air into the parison P, the cooled portion of the parison P does not expand so much as the other portions, resulting in a varied wall thickness. In this first way, the heaters 80 are set to a temperature to keep the segments 65 at a higher temperature than that of the parison P. Thereby, the segment contact side $P_1$ of the parison P keeps at a relatively high temperature, and even when the side $P_1$ is cooled by contact with the cavity 42, the side $P_1$ can maintain substantially the same temperature as the other side $P_2$ which has been out of contact with the segments 65, resulting in an even wall thickness. It occasionally happens that the parison P gets an impression of the segments 65 on the segment contact side $P_1$. However, if the side $P_1$ is heated sufficiently by the heaters 80, the impression will disappear when the parison P is pushed against the cavity 42 by injection of compressed air.

Figure 13:
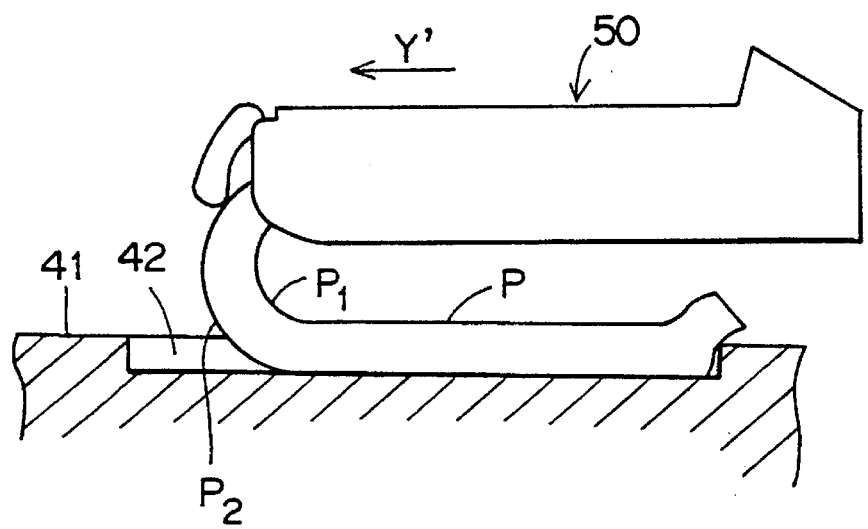
FIG. 13 is an illustration of a second way of putting a parison into a cavity.

A second way is, as shown in FIG. 13, to put the side $P_2$ of a parison P which has been out of contact with the segments 65 into contact with the cavity 42 of a lower mold 41. In this case, the conveyer 50 moves in a direction indicated by the arrow Y'. As mentioned, the parison P may have an impression of the segments 65 on the side $P_1$ which has been in contact with the segments 65. In this second way, the non-contact side $P_2$, not the contact side $P_1$, is put into contact with the cavity 42, and the contact side $P_1$ is not so cooled that the impression will be fixed thereon. In the second way, since the non-contact side $P_2$ is cooled by contact with the cavity 42, the heaters 80 are set to a temperature to keep the segments 65 at a lower temperature than that of the parison P. Thereby, when the parison P is put into the cavity 42, the contact side $P_1$ and the non-contact side $P_2$ are the same temperature, resulting in an even wall thickness.

The temperature setting of the heaters 80 depending on the way of putting a parison into a cavity is applicable to a belt type conveyer and a roller type conveyer as well as the caterpillar type conveyer 50. Further, the controllers of these conveyers do not have to be robots like the six-shaft robot 10, and the conveyers may be controlled in any simpler structure.

Next, referring to FIG. 14, action timing of a manufacturing system which comprises the extruder 30, the robot 10, the conveyer 25 or 50, and the three blow molding machines 40 is described. The blow molding machine disposed in the left upper side in FIG. 1 is referred to as first blow molding machine, the one disposed in the left lower side in FIG. 1 is referred to as second blow molding machine, and the one disposed in the right lower side in FIG. 1 is referred to as third blow molding machine.

A period from S to S' is one cycle, and the cycle is repeated.

The extruder 30 carries out measuring of the material during a time A and extrusion of a parison during a time B. The robot 10 moves the conveyer 25 or 50 to a parison receiving position (under the die head 31) or to a parison feeding position (above a lower mold 41) during a time C. Each of the blow molding machines 40 moves the lower mold 41 to the parison receiving position during a time $E_1$ and to the closing position during a time $E_2$. The mold opening and the mold closing are carried out during a time $F_1$ and during a time $F_2$ respectively. Further, compressed air is injected into a parison during a time G, and the parison is cooled down during a time H while keeping a specified internal pressure.

In this procedure, a single robot 10 and three blow molding machines 40 can be used efficiently, and the productivity is greatly improved.

The arrangement of the three blow molding machines 40 is not limited to the one shown in FIG. 1. The blow molding machines 40 can be arranged radially with the robot 10 in the center such that the lower molds 41 are drawn to the respective parison receiving positions inwardly in the radial direction.

Although the present invention has been described in connection with the preferred embodiments, it is to be noted that various changes and modifications are possible to those who are skilled in the art. Such changes and modifications are to be understood as being within the scope of the present invention.

What is claimed is:

1. An apparatus for manufacturing hollow resin products, the apparatus comprising:

an extruder for extruding a tubular resin material and cutting the material into a parison with a specified length;

a blow molding machine having an upper mold and a lower mold which form a cavity of a specified shape inside; and a parison delivering machine for receiving the parison from the extruder and feeding the parison into the cavity of the lower mold, the parison delivering machine comprising a conveyer which has a parison feeder for feeding a parison longitudinally from an inlet to an outlet, driver for driving the feeder and at least four shafts which serve as pivots of three-dimensional movement of the conveyor wherein the parison delivering machine comprises six shafts, in which:

a first shaft is positioned vertically to a floor and serves as a pivot of a movement of the conveyer in parallel to the floor;

a second shaft is positioned on the first shaft and serves as a pivot of a forward/backward movement of the conveyer;

a third shaft is positioned on the second shaft and serves as a pivot of an upward/downward movement of the conveyer;

a fourth shaft is positioned on the third shaft and serves as a pivot of a swing of the conveyer in a plane perpendicular to a parison feeding direction;

a fifth shaft is positioned on the fourth shaft and serves as a pivot of a swing of the conveyer in a plane including the parison feeding direction; and a sixth shaft is positioned on the fifth shaft and serves as a pivot of a rotation in substantially a horizontal plane on a central portion of the conveyer in the longitudinal dimension.

2. An apparatus for manufacturing hollow resin products as claimed in claim 1, wherein three blow molding machines are provided to work with one extruder and one parison delivering machine.

3. An apparatus for manufacturing hollow resin products as claimed in claim 2, wherein:

each of the blow molding machines has a lower mold which is movable between a closing position and a parison receiving position and an upper mold which is set in the closing position; and the parison receiving position of each lower mold is under a moving range of the conveyer.

4. An apparatus for manufacturing hollow resin products as claimed in claim 1, wherein:

the parison feeder of the conveyer of the parison delivering machine comprises a plurality of segments connected endlessly, the segments being substantially semi-circular so as to agree with the shape of the parison.

5. An apparatus for manufacturing hollow resin products as claimed in claim 4, wherein:

the conveyer is at a higher temperature than the parison; and when the parison is fed from the conveyer into the lower mold, a side of the parison which has been in contact with the conveyer is put into contact with the lower mold.

6. An apparatus for manufacturing hollow resin products as claimed in claim 4, wherein the conveyer comprises a heater for heating the segments.

7. An apparatus for manufacturing hollow resin products as claimed in claim 6, wherein the heater has a plurality of heaters of which set temperatures are individually adjustable.

8. An apparatus for manufacturing hollow resin products as in claim 4, wherein when the parison is fed from the conveyor into the lower mold, a side of the parison which has been out of contact with the conveyor is put into contact with the mold.

9. An apparatus for manufacturing hollow resin products as in claim 8, wherein the conveyor is at a lower temperature than the parison.

* * * * *